United States Patent
Raiz et al.

(10) Patent No.: US 7,278,164 B2
(45) Date of Patent: Oct. 2, 2007

(54) SOFTWARE USAGE/PROCUREMENT MANAGEMENT

(75) Inventors: Leonid Raiz, Newton, MA (US); Irwin Jungreis, Sudbury, MA (US)

(73) Assignee: Revit Technology Corporation, Waltham, MA (US)

( * ) Notice: Subject to any disclaimer, the term of this patent is extended or adjusted under 35 U.S.C. 154(b) by 988 days.

(21) Appl. No.: 09/755,975

(22) Filed: Jan. 5, 2001

(65) Prior Publication Data
US 2002/0164025 A1   Nov. 7, 2002

(51) Int. Cl.
*H04L 9/00* (2006.01)

(52) U.S. Cl. .......................... 726/26; 726/27; 726/30; 380/278

(58) Field of Classification Search ............... 713/189, 713/200–202, 150, 165, 170, 171; 380/201–203, 380/278; 705/50–54, 56–59; 726/2, 26, 726/30–32, 27
See application file for complete search history.

(56) References Cited

U.S. PATENT DOCUMENTS

| | | | | |
|---|---|---|---|---|
| 5,703,951 | A * | 12/1997 | Dolphin ..................... | 705/51 |
| 5,758,068 | A * | 5/1998 | Brandt et al. ............... | 713/200 |
| 6,044,471 | A * | 3/2000 | Colvin ....................... | 726/28 |
| 6,243,468 | B1 | 6/2001 | Pearce | |
| 6,343,280 | B2 * | 1/2002 | Clark ......................... | 705/55 |
| 6,446,260 | B1 * | 9/2002 | Wilde et al. ................ | 717/173 |
| 6,785,825 | B2 | 8/2004 | Colvin | |

OTHER PUBLICATIONS www.elicense.com, ViaTechnologies, Inc., eLicense System.
www.macrovision.com, Macrovision Corporation, SafeDisc.
www.globetrotter.com, GLOBEtrotter Software (purchased by Microvision), FLEXlm and GTlicensing.
www.rainbow.com, Rainbow Technologies, Sentinel Keys, SentinelLM, Sentinel Express.
msdn.microsoft.com/library/books/thin/microsoftlicensing, Microsoft.
Andrew Antal, "AutoCAD Release 14.01 (Cdilla) Frequently Asked Questions", 5 pages (before Jan. 5, 2001).
"Repair Code Analysis", Mar. 12, 1998, 4 pages.
Autodesk License Management System, "Functional and Business Requirement Specifications", US Education Pilot Project, Oct. 3, 1996, 37 pages.
Neil Robbins, "Requirements Document for Repair Code Change to HAPI Sub-System", 1998, 6 pages.
4.1, Electronic Registration Feature Specification, Jan. 6, 1999, 45 pages.
4.1, Soft Lock Feature Specification, Feb. 10, 1998, 36 pages.

* cited by examiner

*Primary Examiner*—Hosuk Song
(74) *Attorney, Agent, or Firm*—Fish & Richardson P.C.

(57) ABSTRACT

A method that includes (1) distributing authorization keys from a subscription server to computers on which copies of an application program are to be run, each of the authorization keys being associated with a validity period during which the authorization key will be valid, and (2) at intermittent times that may be as infrequent as the times when the validity periods end, distributing new authorization keys to each of the computers, the keys being distributed electronically in a manner that is transparent to users of the computers.

44 Claims, 11 Drawing Sheets

Revit Registration                                                        ☒

Figure 1:
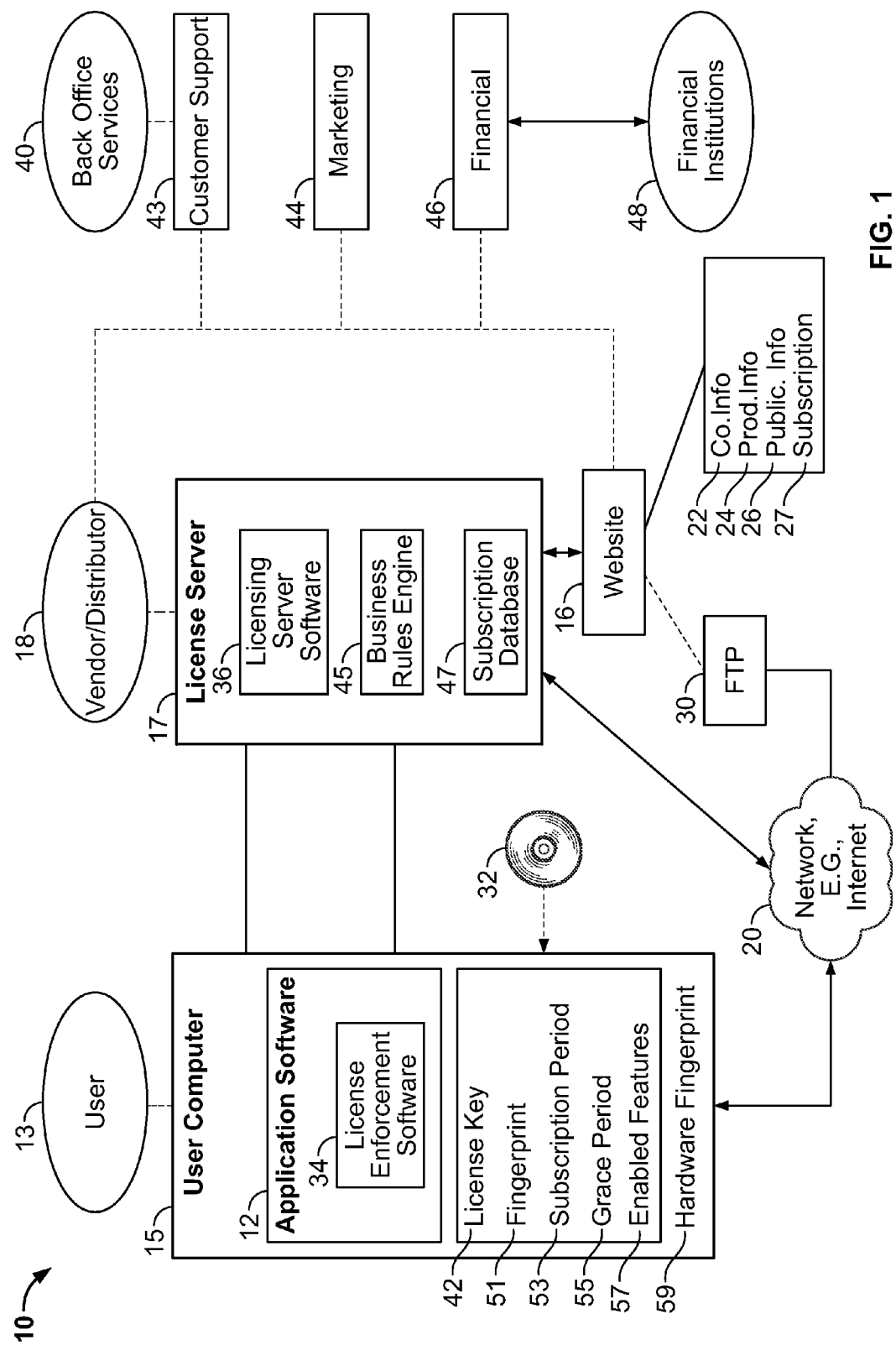

Contact Information (fill in or change):

| James | Dyer | Revit Technology Corporation |
|---|---|---|
| First Name* | Last Name* | Organisation |

Address* [300 Fifth Avenue]   City* [Waltham]   State/Region/Province* [MA]
Address (cont.) [Second Floor]   Postcode* [02451]   Country* [USA]

Phone* [781 839.5300]

┌─ Account Identification ─────────────────┐
│ Email*   [james@revit.com]               │
Fax [781 839.5333]
│ Password* [                ]             │
URL [www.revit.com]
│ Confirm Password* [           ]          │
└──────────────────────────────────────────┘

*required items

Information about Revit, including our privacy policy    [Privacy Policy/Licence]
and licence agreement, is available online.

When your contact information is complete, press Next.

[< Back]   [Next]   [Cancel]   [Help]

FIG. 3

Revit Payment

Billing Information:

| James Dyer | Revit Technology Corporation |
|---|---|
| Name On Card* | Organisation |

Address*: 300 Fifth Avenue    City*: Waltham    State/Region/Province*: MA

Address (cont.):    Postcode: 02451    Country*: USA

Phone*: 781 839.5300    Credit Card*: VISA    Expiration [MM/YYYY]

Referred by:    Card Number*    *required items

Use Revit in: Subscribe

NEW SUBSCRIBERS: By pushing the Submit button, I acknowledge that I have read and agree to the terms of the Subscription and End-User Licence Agreements. Pushing Submit will automatically charge the listed credit card account and process my subscription.

CURRENT SUBSCRIBERS: Pushing the Submit button will update your account information, making no extra charges to your account.

DEMO AND TRIAL USERS: Credit card information is not needed. Pushing Submit completes your application.

[< Back]  [Submit]  [Cancel]  [Help]

FIG. 5

```
/****** Object:  Table ACCOUNT              Salesperson
        AccountId                           Product
        SalesRepId                          Quantity
        AccountName                         UnitPrice
        BillAddress                         Status
        BillAddress2                        Tax
        BillCity
        BillState                   /****** Object:  Table FINREQUEST
        BillPostalCode                      FinRequestId
        BillName                            AccountId
        BillCountry                         SalesRepId
        AuthCodeType                        ManagerId
        AuthCode                            Paymenttypeid
        AuthCodeSuffix                      AccountingId
        Referral                            FinRequestTypeId
        URL                                 DateRequest
        Active_subs                         DateInvoice
        Inactive_subs                       Amount
        ExternalId                          Reason
        PaymentTypeId                       Status
        DateInitial                         Resolution
        AnnivDay
        BillFrequency               /****** Object:  Table PAYMENTTYPE
        LastUpdate                          PaymentTypeId
        Siebel_Id                           PaymentType
        UP_RIGHTS
        NextBillMonth               /****** Object: Table REGION
                                            RegionId
/****** Object:  Table Employee             DivisionId
        EmployeeId                          Region
        FirstName                           Currency
        LastName
        Username                    /****** Object: Table revit_basket
        Password                            shopper_id
        ExternalId                          date_changed
        Salesperson                         marshalled_basket
        SupportRoom
                                    /****** Object: Table revit_dept
/****** Object:  Table EMPLOYEE_REGION       dept_id
        EmpRegionId                         dept_name
        EmployeeId                          dept_description
        RegionId
        SalesType                   /****** Object: Table revit_dept_prod
                                            dept_id
/****** Object:  Table EXP_FINTRAN           sku
        ExpFinTranId
        FinTransactionId            /****** Object: Table revit_product
        Product                             sku
        Description                         name
        DateTransaction                     description
        Amount                              list_price
        ExternalAuth                        paymenttypeid
        Type                                Payterm
        Quantity                            image_file
        Status                              image_width
        Tax                                 image_height
                                            sale_price
/****** Object:  Table EXP_INVTRAN           sale_start
        ExpFinTran                          sale_end
        DateTran                            version
        AccountId                           productno
```

FIG. 6A

```
            HighQty                              /****** Object:  Table SUBSCRIBER
            LowQty                                       SubscriberId
            Discount                                     AccountId
            Country                                      FirstName
            Internal                                     LastName
            Status                                       Title
                                                         Address
/****** Object:  Table revit_receipt                     Address2
            order_id (26)                                City
            shopper_id                                   State
            total                                        PostalCode
            status                                       Country
            date_entered                                 Administrator
            date_changed                                 Phone
            marshalled_receipt                           Fax
                                                         Email
/****** Object:  Table revit_receipt_item                Password
            order_id (26)                                Shopper_Id
            row_id                                       ExtraId
            sku                                          Siebel_Id
            quantity                                     LastUpdated
            adjusted_price                               UP_RIGHTS /**** Object:  Table REVORDER          /**** Object:  Table SUBSCRIPTION
            OrderId                                      SubscriptionId
            AccountId                                    SubscriberId
            SalesrepId                                   AccountId
            PaymentTypeid                                TypeId
            Payterm                                      Username
            DateOrder                                    Password
            DateDefer                                    DateInitial
            Quantity                                     DateExpire
            AvgRate                                      DateExtended
            ExtAmount                                    Rate
            Tax                                          Status
            Processed                                    Protected
            FirstOrder                                   CPUFootprint
            PaymentRef                                   DateCPU
            Status                                       DateSubscribe
            Shopper_Id                                   DateInactive
            DeferApproval                                CPUFootprint2
            Notes                                        DateCPU2
            OrderType                                    CPUFootPrint3
                                                         DateCPU3
/****** Object:  Table SUBACTIVITY                       BillFactor
CREATE TABLE SUBACTIVITY
            SubActivityId
            AccountId
            SubscriptionId
            SalesRepId
            ReasonTypeId
            DateActivity
            Reason
            Notify /****** Object:  Table SUBLOG
            SubLogId
            SubscriptionId
            Event
            EventDate
            Notes
```

FIG. 6B

SOFTWARE USAGE/PROCUREMENT MANAGEMENT

BACKGROUND

This invention relates to software usage and procurement management.

To maintain the economic value in their products, software developers control usage of their software by customers in a variety of ways, both technological and legal. Off-the-shelf shrink-wrapped software, for example, typically is sold subject to a standard form license agreement that restricts copying. When the user installs the software he must enter a software key to confirm his right to proceed.

When software is downloaded from a server to a user's computer, similar legal and technological mechanisms are applied to control usage. In one example, the user requests a key from a central location. Operators at the central location manually verify the user's account and generate a key, which is sent to the user by phone or email.

For some kinds of software, the user is required to pay a periodic usage fee for the right to continue his usage.

SUMMARY

In general, in one aspect, the invention features a method that includes (1) distributing authorization keys from a subscription server to computers on which copies of an application program are to be run, each of the authorization keys being associated with a validity period during which the authorization key will be valid, and (2) at intermittent times that may be as infrequent as the times when the validity periods end, distributing new authorization keys to each of the computers, the keys being distributed electronically in a manner that is transparent to users of the computers.

Implementations of the invention may include one or more of the following features. The new authorization keys are distributed in exchange for money. Each new authorization key is distributed automatically when an existing authorization key has reached the end of its validity period. The authorization key carries information about the validity period. The new authorization keys are distributed by communication between the subscription server and each of the computers using a standard communication protocol on a publicly accessible communication network. The validity period comprises a normal calendar period, e.g., a month. When a validity period lapses, a grace period is automatically provided based on information contained in the authorization key, the grace period permitting continued running of the application program. The authorization key carries information about the grace period.

Each of the authorization keys carries information about the identity of a computer on which use of the application computer is authorized. Each of the authorization keys carries information about features of the application program that are enabled by the key. The identity comprises information stored on a microprocessor, a hard disk, or a network interface card. The application program is distributed on a portable medium or by a software download via the Internet. The subscription server associates the identity of each of the computers with a unique user identifier and uses the association in connection with distributing new authorization keys. Use of the application program by a user may be transferred for use on another computer under control of the subscription server by issuing a new authorization key associated with the identity of the other computer and with the user.

The authorization keys are distributed in response to instructions given by a user interactively using a standard TCP/IP communication to the subscription server. The application program automatically initiates communication with the subscription server to update the authorization keys at the ends of the validity periods. The application program may be used for a period as long as the validity period while the computer on which it is running is out of communication with the subscription server. Users of the copies of the application programs are grouped within enterprises and the enterprise interacts with the subscription server to manage the number and duration of authorization keys that are distributed to its users and the payment for the authorization keys. The authorization keys are stored on the user computers. When one of the copies of the application program is to be run at one of the computers, a determination is made whether the identity of the computer conforms to the authorization key that was distributed to that computer and whether the validity period is in effect, and if so, the application program is permitted to be run. The authorization key is encrypted. A user self-subscribes for the use of the application program without help of another person. The subscription server comprises an Internet server using a standard TCP/IP protocol.

The application program may be run in at least two different modes of use. One of the modes does not require an authorization key, at least one of the modes requires an authorization key, and at least one of the modes comprises a demonstration mode in which some features of the application program are disabled. At least one of the modes is defined by a selection of available features of the application program. At least one of the modes comprises a subscription mode. At least one of the modes comprises full use of the application program. The authorization key is distributed in exchange for a payment.

In general, in another aspect, the invention features a method comprising (1) distributing without charge, copies of an application program online or on storage media, (2) enabling a user of one of the computers to choose among modes he wishes to run the application program, (3) in at least one of the chosen modes, enabling the user to run the application program without requiring the user to provide information about the user, (4) in at least another one of the chosen modes, requiring the user to self-register by providing information about the user in exchange for an authorization key that is associated with a unique identifier of the computer on which the application program is to run and which enables the application to be run in the chosen mode, the authorization key having a limited validity period.

In general, in another aspect, the invention features, a method that includes (1) receiving at a subscription server, information identifying individual users who are to be permitted to use copies of an application program on computers, (2) when one of the users first attempts to use a copy of the application program on one of the computers, sending the identity of the user to the subscription server electronically, (3) at the server, matching the user identity with the information identifying individual users, and, (4) if they match, providing an authorization key to the computer, the authorization key being associated uniquely with the computer from which the user is attempting to use the copy of the application program.

Among the advantages of the invention are one or more of the following. The intellectual property value of the software or other product is protected while the user can take advantage of flexible usage and pricing options that can be made available by the vendor. The effort required for a user to both use and maintain the software is reduced. The system is easy to use initially and on an on-going basis. No human intervention from the vendor need be required for authorization. The system prompts the user only for information that cannot otherwise be gathered from existing information or the user's machine. The system establishes a subscription service type of experience for the user including an initial purchase decision and an ongoing negative option subscription in which the subscription continues until cancelled.

The system enables easy integration with financial and account management systems.

The vendor can use the system to easily track free trials, conversion ratios, and actual usage by different users/machines (for potential up-selling or bundling opportunities) and other parameters. The system also tracks the version of software being used so that upgrades can be provided in an unobtrusive manner, considering not only system stability and capabilities, but also compatibility issues that may affect the user's business.

The vendor can take advantage of marketing and sales opportunities by receiving notices at certain milestones, to enable, for example, an email or call them before their subscription expires or changes to a different level of service.

Other advantages and features will become apparent from the following description and from the claims.

DESCRIPTION

Figure 2:
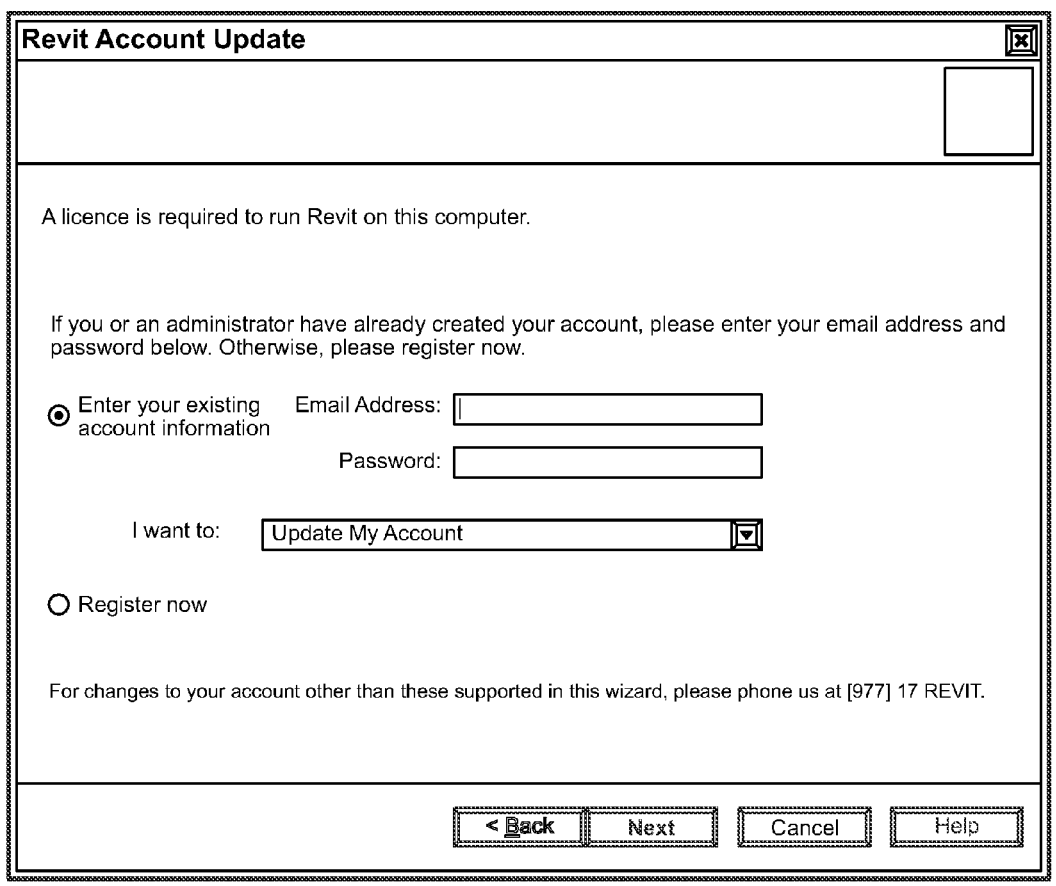
Figure 4:
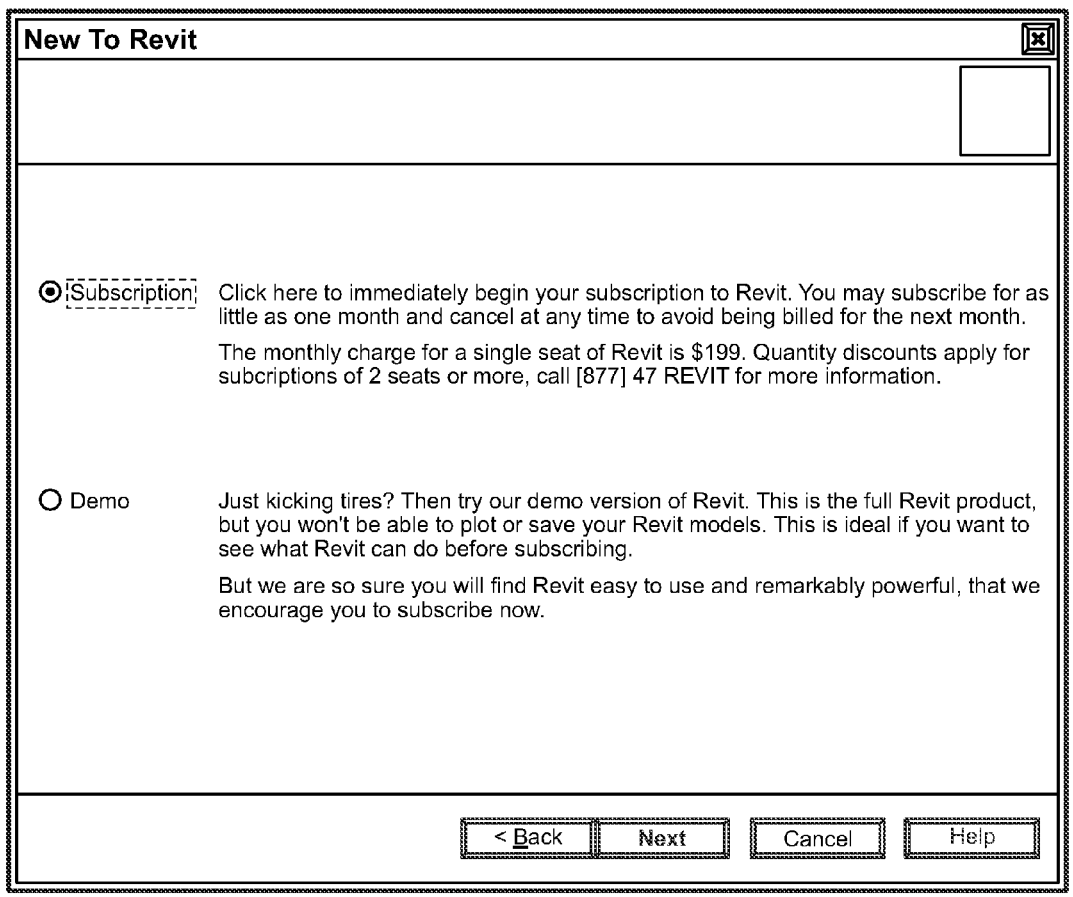

FIG. 1 shows a usage/procurement management system.
FIG. 2 shows an account update screen.
FIG. 3 shows a contact information screen.
FIG. 4 shows a function selection screen.
FIG. 5 shows a billing information screen.
FIGS. 6A and 6B show features of a subscription database.
FIGS. 7 through 10 are screens associated with an account administration application.

As shown in FIG. 1, a software usage/procurement management system 10 is arranged to enable management and licensing of a software product 12 (for example, Parametric Building Modeling software of the kind marketed by Revit Technology Corporation under the name Revit) to, and use by, prospective users and actual users 13 on their computers 15. The system permits management of the usage of and payment for use of the product during a lifecycle that begins with the first delivery of demonstration versions to prospective users and continues with fulfillment and control of ongoing subscriptions for the actual users 13.

Each of the computers 15 should have a communication capability and should be connected from time to time to a license server 17 by a direct dialup connection or through a network 20 (such as a local area network or a publicly accessible network like the Internet). For periods of time, however, each of the computers also can be operated in a stand-alone mode without any communication link to the server.

The system includes a web site 16 of a vendor or distributor 18 of the software that is publicly accessible through the network 20 by licensed users and prospective users. The website provides the public free access to company information 22, product information 24, to other public information 26, and to a section 27 that enables a user to subscribe to use of software product. The product information 24 includes an opportunity to request a demonstration version of the software by registering contact information and an email address. A user can obtain the demonstration version either by downloading from an FTP site 30 or by requesting shipment of a CD-ROM version 32.

The system includes license enforcement software 34 that is distributed with the product and runs on the user's computer. The system also includes licensing server software 36 that runs on the licensing server 17 operated by the vendor or distributor. The financial and commercial functions required by the licensing sever software are provided from back office services 40 that include customer support 43, marketing 44, and financial 46 systems. The financial system interacts with financial institutions 48.

The licensing server can exchange information with registered users (i.e., those that have registered with the system but are not yet licensed subscription users) and with licensed users automatically and transparently to the users. Licensed users receive license rights automatically from the licensing server through the license enforcement software running on the user's computer. These automatic transactions are effected by a connection to the license server made automatically by the user's computer.

Six modes of operation in the lifecycle of the relationship between the software vendor or distributor and users are shown in Tables I through VI. Each table has three columns associated with the three major parts of the system: the user computer running the license enforcement software, the license server running the licensing server software, and the e-commerce/back office elements that support the license server.

Each of the tables is organized in rows that represent time sequences of events. Events shown in later rows occur after events shown in earlier rows. Events shown in a given row occur at roughly the same time.

TABLE I

MODE 1-DEMONSTRATION VERSION FOR A FIXED PERIOD OF TIME (ELAPSED AND SINGLE FREE TRIAL PER USER) SCENARIO.

| User Computer | License Server | E-commerce/Back Office |
|---|---|---|
| The user obtains and installs software. Every installation of software operates in demonstration mode, delivering restricted functionality to the user. On an attempt to run application the user will be prompted to register and subscribe via the subscription wizard. | | |

TABLE I-continued

MODE 1-DEMONSTRATION VERSION FOR A
FIXED PERIOD OF TIME (ELAPSED AND SINGLE FREE
TRIAL PER USER) SCENARIO.

| User Computer | License Server | E-commerce/Back Office |
|---|---|---|
| The user may elect to avoid registering or subscribing through the subscription wizard. A license key is installed on a computer allowing demonstration use software. Some features of application are disabled during demonstration mode. Each time user attempts to use a feature which is disabled, he again will be prompted to subscribe. | | |

In the first mode, shown in Table I, a user wants to use a demonstration version of the software product. The user obtains a CD or downloaded copy of the software product (also called the application in the following discussion) and installs it. Every initial installation of the application operates in demonstration mode. The user has access only to restricted functional capabilities.

After installation, when the use launches the application for the first time, the license enforcement software prompts the user to register and subscribe using a software registration wizard, the initial screen of which is shown in FIG. 2. The user has the option to supply contact information (i.e., to register) through the screen shown in FIG. 3 or to choose not to register at this time.

Upon completion of the start-up procedure, a software license key 42 (FIG. 1) is installed on the computer allowing demonstration use of the software. In the case of demonstration mode, unlike other modes described later, the software key is generated locally by the licensing enforcement software. In demonstration mode, some features of the application are disabled. When the user attempts to use disabled features he will be prompted with the option to subscribe using the software registration wizard.

The software key enables the user to operate in the demonstration mode for a fixed period of time, say 30 days. When the 30 days ends, the user can initiate another demonstration period in the same way. When an initial subscription or an ongoing subscription (described below) lapses, the user is returned to the demonstration mode.

Each license key is encrypted and carries information that includes the fingerprint of the computer 51 on which it is authorized to be used, the features of the application 57 that are enabled by the key, the subscription period 53, and the grace period 55, if any. The fingerprint 59 of the computer can be, for example, digital information stored on a microprocessor, a hard disk, or a network interface card.

TABLE II

MODE 2-INITIAL SUBSCRIPTION FOR A
FIXED PERIOD OF TIME SCENARIO.

| User Computer | License Server | E-commerce/Back Office |
|---|---|---|
| The user obtains and installs software. Every installation of software operates in demonstration mode, delivering restricted functionality to the user. On an attempt to run application the user will be prompted to register and subscribe via the subscription wizard. The user will enter account information for registration purposes and selects a password. The user must indicate the desired level of his subscription. If the selected subscription level requires payments, the user indicates payment method instructions. The user's computer is fingerprinted. The user account information and computer fingerprint are verified for completeness and passed to the license server. | | |
| | The user account Information is automatically entered into a subscription database. A new user account is created. The license server issues a software license key to the user computer. This key is encrypted to work on a specific user computer for a specified period of time. | |

TABLE II-continued

MODE 2-INITIAL SUBSCRIPTION FOR A FIXED PERIOD OF TIME SCENARIO.

| User Computer | License Server | E-commerce/Back Office |
|---|---|---|
| The license key is delivered and installed on the user computer allowing the use software for a specified period of time. All license key(s) will need to be renewed after expiration. | Whenever a record is created or updated in the subscription database, account information is provided for marketing and customer support systems. The payment information is directed to the financial system | |
| | | The payment method is validated and charged. Once complete, payment information is posted back to the license server. |
| | The user account status is marked as being current up to date. | |

In the second mode of operation, called Initial Subscription (unrestricted), the user obtains and installs the application. As previously mentioned, the software application operates in demonstration mode delivering restricted functional capabilities to the user.

As before, when the user first launches the application, the system prompts the user to register and subscribe through the software registration wizard.

To subscribe, the user enters account information for registration purposes and selects a password as shown in FIG. 2.

The user may be presented with a chance to select among several levels of functional capabilities/configuration, as shown in FIG. 4. The user will choose a desired level of subscription. Should the selected subscription level require payment, the user must supply payment method instructions as shown on FIG. 5.

Upon completion of the registration process, the user's computer is fingerprinted and the user data is verified for completeness at his computer. The registration and payment information and the computer fingerprint are passed to the license server.

At the license sever, the received information is entered into a subscription database 47, the structure of which is shown in FIGS. 6A and 6B. Next, a new user account is created.

Once the new account has been created in the license server subscription database, an encrypted license key is issued for the user's computer. The key is encrypted to work on only on the user's fingerprinted computer and only for a specified period of time (e.g., a month). The issuance of license keys, in this mode and other modes, always is based on testing of business rules (implemented by a business rules engine 45, FIG. 1) that are stored at the license server. With respect to a later-described mode, for example, the business rules could prevent the application from being moved to more than 2 additional computers within a single month, or could prevent the total number of users at one account from exceeding 100 without special approval.

The newly created license key is delivered and installed on the user computer allowing the use of the application for the specified period of time. In order for the application to remain functional, in unrestricted mode, the license key must be renewed after expiration.

Each time a new user subscribes to use the application, contact information is provided to marketing and customer support systems. Payment information is directed to the financial system where the method of payment is validated and charged. Payment fulfillment information is then posted back to the license server.

At the completion of this procedure, the user's account is marked as being up to date within the vendor license server's subscription database.

TABLE III

MODE 3-ONGOING SUBSCRIPTION SCENARIO

| User Computer | License Server | E-commerce/Back Office |
|---|---|---|
| | | The financial system charges payment method monthly and posts user account status to the license server. |
| | User account is marked as current and paid up for a specified period of time. | |

TABLE III-continued

MODE 3-ONGOING SUBSCRIPTION SCENARIO

| User Computer | License Server | E-commerce/ Back Office |
|---|---|---|
| The user starts application. The user's computer is fingerprinted. The license key is decrypted and validated. If license key has expired application automatically connects to license server without prompting a user. The computer fingerprint is passed to the license server and requests a new license key. | | |
| | The delivered computer fingerprint is validated. The user account status is checked. A new encrypted license key is issued to user computer allowing the use of software for a specified period. | |
| A software license key is delivered and installed on the user computer allowing the use software for a specified period of time. All license key(s) needs to be renewed after expiration. | | |

In the third mode of operation, called Ongoing Subscription (unrestricted), the financial system automatically charges the user's account monthly and upon the successful verification of payment posts the account status to the license server.

Upon the payment, the user account in the subscription database is marked as having been paid up for a newly specified current billing cycle.

Every time the user starts the application, the user's computer is fingerprinted. The current user/computer license key stored on the user's computer is decrypted and validated. If the license key has expired, the application connects to the license server without prompting a user; and it passes the computer fingerprint to the license server and requests a new license key.

Upon validation of the computer fingerprint and user account status, a new encrypted license key is issued, delivered and installed on the user computer allowing the use of the application until the end of current billing cycle. The license key must be renewed again after expiration. Thus, the license key need not be renewed any more frequently than when the authorization key periods end.

If the license key cannot be renewed because the account cannot be made current, the user is required to provide current financial information through the registration wizard.

In this mode and in the initial subscription mode, if the validity period lapses without the license key having been renewed, the license key automatically enters a grace period based on information contained in the authorization (license) key. If allowed by the key, the grace period permits continued running of the application until the end of the grace period, transparently to the user. Every time the user starts, the application while in the grace period the application will attempt to connect to the license server and request a renewed authorization key. During the grace period, if connection cannot be made or the user account is not up to date, the application will continue its unrestricted operations. At the end of the grace period, the user is alerted to call in or complete the registration wizard information to re-start the account. If the grace period ends with no issuance of a replacement license key, the application reverts to the demonstration mode.

During the validity period of any license key, the computer for which it is issued can be used to run the permitted features of the application anywhere, whether the computer is attached to a communication link to a server or not. The license key and the license enforcement software are self-enforcing on the computer even if the computer is disconnected to any communication link.

TABLE IV

MODE 4-SWAPPING COMPUTERS SCENARIO

| User Computer | License Server | E-commerce/ Back Office |
|---|---|---|
| A user wants to move software license to a new computer. When the user attempts to run installed application he will be prompted to either provide existing account identification or subscribe and register. The user chooses enters account identification and password. The user account identification is passed to the license server. | | |

TABLE IV-continued

MODE 4-SWAPPING COMPUTERS SCENARIO

| User Computer | License Server | E-commerce/Back Office |
|---|---|---|
| | The user account is located in the database and validated. Detailed account information is passed back to application and presented in the software subscription wizard. | |
| The detailed user account information, including current payment instructions, is presented to user for optional update. The user's computer is fingerprinted. Any updated user account information along with computer fingerprint will be passed to license server. | | |
| | The updated user information is validated and the account records are updated. A license key is issued to the user computer. The key is encrypted to work on the user computer for a specified period of time. | |
| A software license key is delivered and installed on the user computer allowing the use of the software for a specified period of time. All license key(s) need to be renewed after expiration. | The updated user account information is provided for marketing and customer support systems. Updated payment information is directed to the financial system | |

The fourth mode of operation, called User Computer Modification, applies when the user wants to move an existing valid license to a new computer.

When the user attempts to run the installed application on a new computer, he will be prompted to either provide existing account identification or subscribe and register. Once supplied, the account identification and password information is passed to the license server where the user account is located in the subscription database and validated.

Detailed account information including current payment instructions is passed back to the application and presented to the user for optional update and the user's computer is fingerprinted.

Once the user verifies or updates the account information, that information and the computer fingerprint is passed to the license server. At the license server, the information is validated. The user account records are updated, and a new license key is issued and delivered to the user computer. As with all of the subscription modes of operation, the key is encrypted to work only on the user computer and only until the end of current billing cycle.

Whenever a user modifies his account information, the updated tracking information is provided for marketing and customer support systems and the updated payment information is directed to the financial system.

TABLE V

MODE 5-ACCOUNT MAINTENANCE SCENARIO

| User Computer | License Server | E-commerce/Back Office |
|---|---|---|
| A user wants to change his account information, payment instructions, or level of subscription. The user starts the application and initiates request to update account information from within the software. The user enters his account identification and password. The account identification is passed to the license server. | | |
| | The user account is located in the database and validated. Detailed account information is passed back to application and presented in the software subscription wizard. | |

TABLE V-continued

MODE 5-ACCOUNT MAINTENANCE SCENARIO

| User Computer | License Server | E-commerce/ Back Office |
|---|---|---|
| Current account profile is presented to user for an update. The user's computer is fingerprinted. Any updated user account information along with computer fingerprint will be passed to license server. | | |
| | The updated user account information is validated against company rules for allowable number of licensed computers per account, frequency of license transfers and account status. The user account records are updated in the database. A license key is issued to the user computer. The key is encrypted to work on the user computer for a specified period of time. | |
| The license key is delivered and installed on user computer allowing the use of software for a specified period of time. | The updated user account information is provided for marketing and customer support systems. Updated payment information is directed to the financial system | |

The fifth mode of operation, called Account Maintenance, applies when a user wants to change account information, payment instructions, or level of subscription.

When the user starts the application, he initiates a request to update account information from within the application and enters his account identification and password.

The account identification is immediately passed to the license server. The License server locates and validates the user account record in the subscription database.

The current account profile information including current payment instructions is passed back to application and presented to the user for an update and the user's computer is fingerprinted.

The updated account information along with computer fingerprint is passed to license server where it is validated against company rules for allowable number of licensed computers per account, frequency of license transfers and account status and the user account records are updated and a new license key is issued and delivered to the user computer.

As with the any subscription mode of operation, the key is encrypted to work on the user computer until the end of current billing cycle.

Whenever a user modifies his account information, the updated tracking information is provided for marketing and customer support systems and the updated payment information is directed to the financial system.

TABLE VI

MODE 6-ADDING AND REMOVING USERS SCENARIO

| User Computer | License Server | E-commerce/ Back Office |
|---|---|---|
| Authorized user (administrator) connects directly to the License Server using any web browser software. Access to vendor License Server does not require any special software. Administrator enters company email address and password combination to access software license information. | | |
| | The administrator account is located in the database and validated. Detailed account information is passed back to administrator's computer. | |

TABLE VI-continued

MODE 6-ADDING AND REMOVING USERS SCENARIO

| User Computer | License Server | E-commerce/Back Office |
|---|---|---|
| Administrator is presented with a form displayed through the web browser that contains a current listing of all users.<br>Administrator is provided with account management options.<br>Administrator adds new users to the company account or removes existing users from the company account.<br>Any updated user account information is passed to license server. | | |
| | The updated user information is validated and the account records are updated.<br>The updated user account information is provided for marketing and customer support systems. Updated payment information is directed to the financial system | |
| | | The payment method is validated and charged. Once complete, payment information is posted back to the license server. |
| | The user accounts statuses are marked as being current up to date. | |
| New user previously added by an administrator launches the application on his computer.<br>The user is prompted to register or subscribe.<br>The user enters his user identification/password combination provided by an administrator.<br>The software fingerprints the user computer, connects with the license server and requests authorization key. | | |
| | License server validates user account and issues a license key | |
| A software license key is delivered and installed on the user computer allowing the use of the application for a specified period of time. All license key(s) need to be renewed after expiration<br>Old user previously removed by an administrator launches the application on his computer after his license key has expired.<br>The software fingerprints user computer, connects with the license server and requests renewal of authorization key. | | |
| | License server validates user account and declines to issue a renewed license key | |
| The software application disables the use of restricted features, reverts to a demonstration mode and prompts the user to re-subscribe. | | |

The sixth mode of operation, called Adding and Removing Users, is initiated by an administrator of an authorized user, e.g., a company, connecting directly to the license server using any web browser and a connection through the Internet. No special software is required at the user end.

Figure 7:
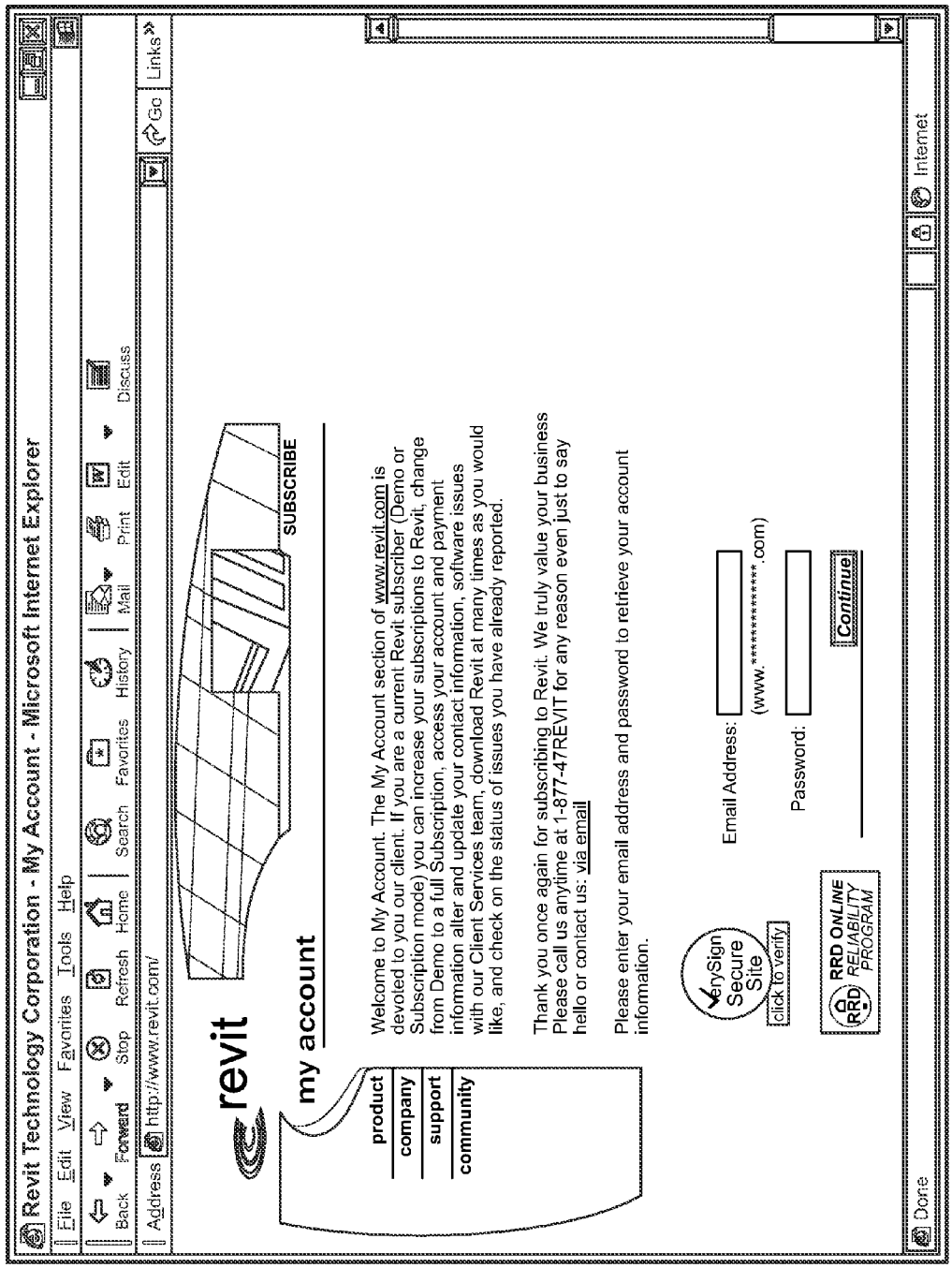

As shown in FIG. 7, the administrator enters the email address and password combination. The administrator account is located in the subscription database and validated. Detailed account information is then served back to the administrator's computer.

Figure 8:
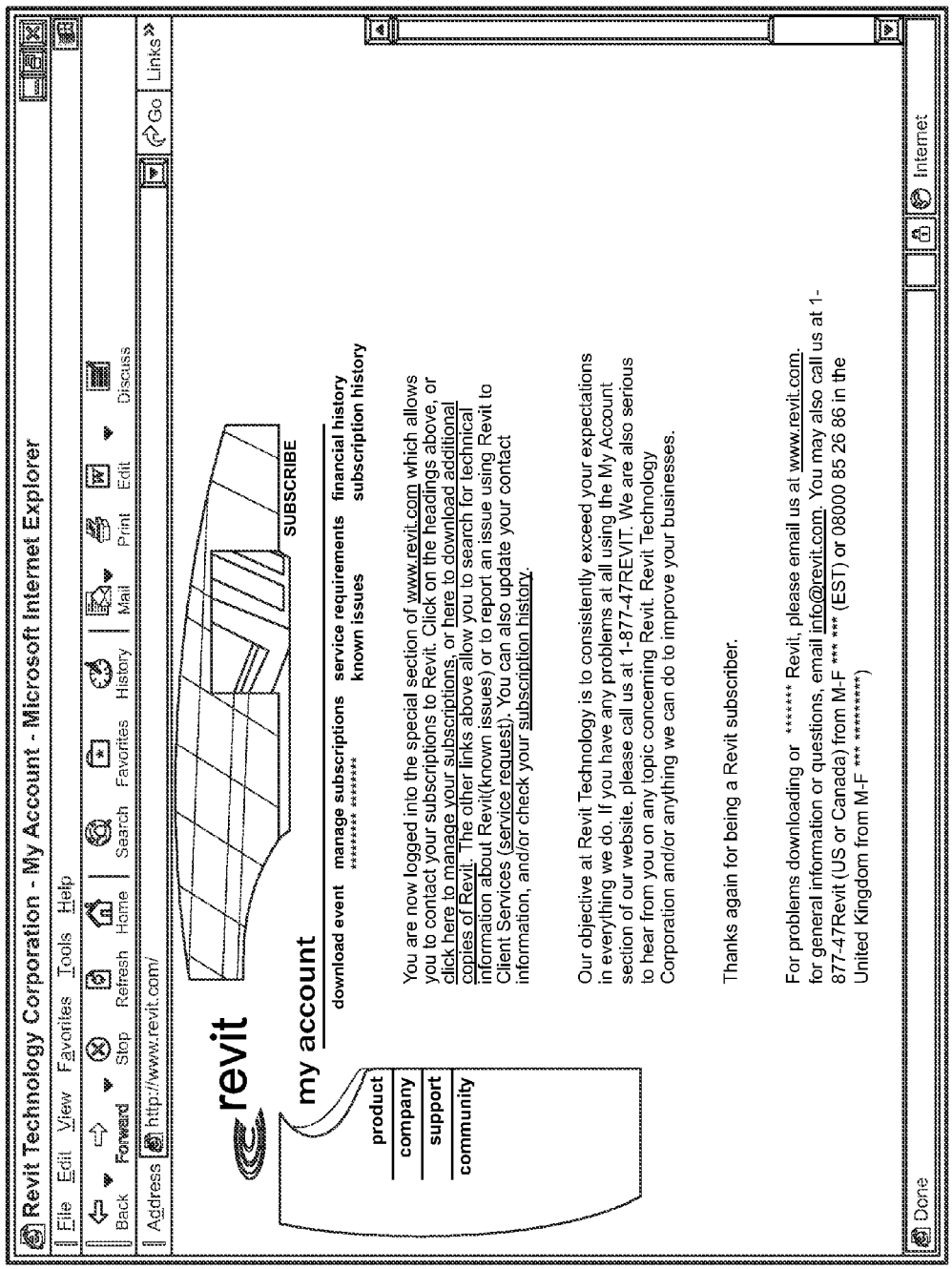

The administrator is given options of which functions he wishes to invoke, as shown in FIG. 8. By invoking the manage subscriptions options, a current listing of individual users is then displayed through the web browser to the administrator, as shown in FIG. 9 (only one user is listed in the example).

Figure 9:
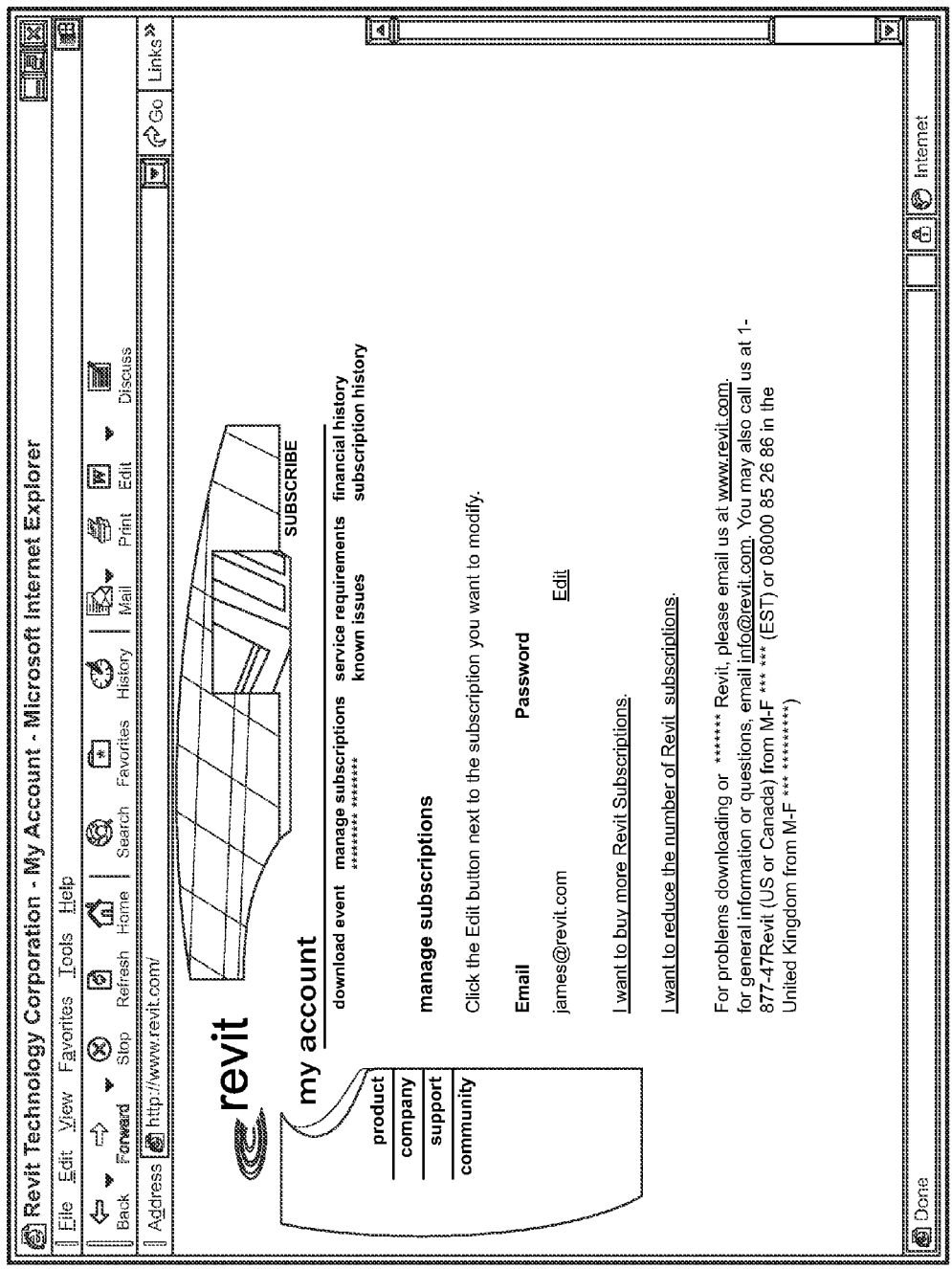

Underneath the list of users on FIG. 9, the administrator is given options that include adding new users or reducing the number of users.

Figure 10:

New users can be added, or existing user information modified, by entering the appropriate information in a screen like the one shown in FIG. 10.

All updated account information is passed to the license server. The license server validates the information and updates the account records in the subscription database. The updated information is passed to marketing and customer support. Updated payment information is passed to the financial system. The payment method is validated and the account is charged by the back office systems. Once complete, payment information is posted back to the license server, which marks the user account statuses as up to date.

After a new user is added by an administrator, when the user launches the application and is prompted to register or subscribe, the user enters a user identification/password combination provided to him by the administrator. The license enforcement software then fingerprints the user's computer, dials up the license sever and requests an authorization key. The license server validates the user account and issues a license key.

The key is delivered and automatically installed on the user computer, allowing the use of the application for the specified period of time.

If an old user, previously removed from the user list by an administrator, launches the application on his computer after the key has expired, then the license enforcement software fingerprints the user's computer and requests renewal. The license server validates the user's account and declines to issue a renewed key.

The application then disables the user of the restricted features, reverts to a demonstration mode, and prompts the user to re-subscribe. Other implementations are within the scope of the following claims.

The invention claimed is:

1. A method comprising
distributing authorization keys from a subscription server to computers on which copies of an application program are stored and are to be run, each of the authorization keys being associated with a validity period during which the authorization key will be valid and each authorization key allowing an application program to be operated during the validity period, each authorization key identifying a fingerprint of a particular computer for which the authorization key is valid, and
at intermittent times that may be as infrequent as the times when the validity periods end, distributing new authorization keys to each of the computers, the keys being distributed electronically in a manner that is transparent to users of the computers.

2. The method of claim 1 in which the new authorization keys are distributed in exchange for money.

3. The method claim 1 in which each new authorization key is distributed automatically when an existing authorization key has reached the end of its validity period.

4. The method of claim 1 in which the authorization key carries information about the validity period.

5. The method of claim 1 in which the new authorization keys are distributed by communication between the subscription server and each of the computers using a standard communication protocol on a publicly accessible communication network.

6. The method of claim 1 in which the validity period comprises a normal calendar period.

7. The method of claim 6 in which the validity period comprises a month.

8. The method of claim 1 also including
when a validity period lapses, automatically providing a grace period based on information contained in the authorization key, the grace period permitting continued running of the application program.

9. The method of claim 8 in which the authorization key carries information about the grace period.

10. The method of claim 1 in which each of the authorization keys carries information about the identity of a computer on which use of the application program is authorized.

11. The method of claim 1 in which each of the authorization keys carries information about features of the application program that are enabled by the key.

12. The method of claim 10 in which the identity comprises information stored on a microprocessor, a hard disk, or a network interface card.

13. The method of claim 1 in which the application program is distributed on a portable medium or by a software download via the Internet.

14. The method of claim 10 in which the subscription server associates the identity of each of the computers with a unique user identifier and uses the association in connection with distributing new authorization keys.

15. The method of claim 1 in which use of the application program by a user may be transferred to use on another computer under control of the subscription server by issuing a new authorization key associated with the identity of the other computer and with the user.

16. The method of claim 1 in which the authorization keys are distributed in response to instructions given by a user interactively using a standard TCP/IP communication to the subscription server.

17. The method of claim 1 in which the application program automatically initiates communication with the subscription server to update the authorization keys at the ends of the validity periods.

18. The method of claim 1 in which the application program may be used for a period as long as the validity period while the computer on which it is running is out of communication with the subscription server.

19. The method of claim 1 in which users of the copies of the application programs are grouped within enterprises and the enterprise interacts with the subscription server to manage the number and duration of authorization keys that are distributed to its users and the payment for the authorization keys.

20. The method of claim 1 in which the authorization keys are stored on the user computers.

21. The method of claim 1 also including
when one of the copies of the application program is to be run at one of the computers, determining whether the identity of the computer conforms to the authorization key that was distributed to that computer and whether the validity period is in effect, and
if so, permitting the application program to be run.

22. The method of claim 1 in which the authorization key is encrypted.

23. The method of claim 1 in which a user self-subscribes to the use of the application program without help of another person.

24. The method of claim 1 in which the subscription server comprises an Internet server using a standard TCP/IP protocol.

25. The method of claim 1 in which the application program may be run in at least two different modes of use.

26. The method of claim 25 in which one of the modes does not require an authorization key.

27. The method of claim 25 in which at least one of the modes requires an authorization key.

28. The method of claim 25 in which at least one of the modes comprises a demonstration mode in which some features of the application program are disabled.

29. The method of claim 25 in which at least one of the modes comprises a subscription mode.

30. The method of claim 25 in which at least one of the modes comprises full use of the application program and the authorization key is distributed in exchange for a payment.

31. The method of claim 25 in which at least one of the modes is defined by a selection of available features of the application program.

32. A method comprising
distributing without charge, copies of an application program online or on storage media for installation on one or more computers,
enabling a user of one of the computers to choose among modes in which he wishes to run the application program,
in at least one of the chosen modes, enabling the user to run the application program without requiring the user to provide information about the user,
in at least another one of the chosen modes, requiring the user to self-register by providing information about the user in exchange for an authorization key that is associated with a unique identifier of the computer on which the application program is to run and which enables the application to be run in the chosen mode, the authorization key having a limited validity period.

33. The method of claim 32 in which one mode comprises a demonstration mode that does not require any information or payment.

34. The method of claim 32 in which one mode comprises a trial mode that requires information but no payment.

35. The method of claim 32 in which one mode comprises a subscription mode that requires information and payment.

36. The method of claim 32 in which the modes are defined by selections of features of the application.

37. The method of claim 32 in which use of the application program by a user may be transferred for use on another computer under control of the subscription server by issuing a new authorization key associated with the identity of the other computer and with the user.

38. The method of claim 32 in which the application program is distributed on a portable medium or by a software download through the Internet.

39. The method of claim 32 in which the authorization keys are distributed in response to instructions given by a user interactively using a standard TCP/IP communication to the subscription server.

40. The method of claim 32 in which the application program may be used for a period as long as the validity period while the computer on which it is running is out of communication with the subscription server.

41. The method of claim 32 in which users of the copies of the application programs are grouped within enterprises and each of the enterprises interacts with the subscription server to manage the number and duration of authorization keys that are distributed to its users and the payment for the authorization keys.

42. The method of claim 32 in which the authorization keys are stored on the user computers.

43. A method comprising
receiving at a subscription server, information identifying individual users who are to be permitted to use copies of an application program on computers,
when one of the users first attempts to use a copy of the application program on one of the computers, sending the identity of the user to the subscription server electronically,
at the server, matching the user identity with the information identifying individual users, and, if they match,
providing an authorization key to the computer, the authorization key being associated uniquely with the computer from which the user is attempting to use the copy of the application program.

44. The method of claim 1, where the application program compares the information of the authorization key identifying the particular computer with an identity of the computer and where the application program is not operable if the information does not match.

* * * * *